(12) United States Patent
Krishnasamy et al.

(10) Patent No.: US 10,607,266 B2
(45) Date of Patent: *Mar. 31, 2020

(54) METHOD AND SYSTEM FOR SMS INTERMEDIATION

(71) Applicant: eBay Inc., San Jose, CA (US)

(72) Inventors: Harish Kumar Krishnasamy, San Jose, CA (US); Alok Sharma, Bellandur (IN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/552,763

(22) Filed: Aug. 27, 2019

(65) Prior Publication Data
US 2019/0385203 A1  Dec. 19, 2019

Related U.S. Application Data

(63) Continuation of application No. 14/280,515, filed on May 16, 2014, now Pat. No. 10,438,252.

(30) Foreign Application Priority Data

Mar. 3, 2014  (IN) .......................... 1087/CHE/2014

(51) Int. Cl.
G06Q 30/00  (2012.01)
G06Q 30/06  (2012.01)

(52) U.S. Cl.
CPC ......... G06Q 30/06 (2013.01); G06Q 30/0625 (2013.01)

(58) Field of Classification Search
CPC ........................... G06Q 30/0625; G06Q 30/06

USPC ..................................................... 705/26.62
See application file for complete search history.

(56) References Cited

U.S. PATENT DOCUMENTS

| 5,325,419 A | 6/1994 | Connolly et al. |
| 5,613,133 A * | 3/1997 | Bell .......................... G06F 9/24 |
| | | 712/E9.007 |
| 6,868,544 B2 | 3/2005 | Dalal et al. |
| 7,031,733 B2 | 4/2006 | Alminana et al. |
| 7,318,098 B2 | 1/2008 | Steinberg et al. |
| 8,589,239 B2 | 11/2013 | Zacarias et al. |

(Continued)

OTHER PUBLICATIONS

Anonymous Payment in a Client Centric Model for Digital Ecosystems, at 2007 Inaugural IEEE International Conference on Digital Ecosystems and Technologies. Author: Jesu's Tellez Isaac and Jose Sierra Caimara (Year: 2007).*

(Continued)

Primary Examiner — Jeffrey A. Smith
Assistant Examiner — Lalith M Duraisamygurusamy
(74) Attorney, Agent, or Firm — SBMC

(57) ABSTRACT

A system for receiving, at a server with one or more processors, a request for a respective product page from a first client system. The system then sends the respective product page to the first client system for display, wherein the respective product page includes a send SMS message link. The system receives, from the first client system, a first SMS message, wherein the first SMS message is generated by user selection of the send SMS message link. The system transmits the first SMS message to a second client system associated with a seller of the respective product.

20 Claims, 10 Drawing Sheets

(56) References Cited

U.S. PATENT DOCUMENTS

| | | | | |
|---|---|---|---|---|
| 8,676,179 | B2* | 3/2014 | Baccay | H04M 3/42042 455/414.1 |
| 8,817,663 | B2* | 8/2014 | McEachern | H04L 12/56 370/252 |
| 10,438,252 | B2 | 10/2019 | Kumar et al. | |
| 2002/0099622 | A1* | 7/2002 | Langhammer | G06Q 30/02 705/26.44 |
| 2005/0114533 | A1* | 5/2005 | Hullfish | H04L 51/04 709/230 |
| 2006/0135185 | A1* | 6/2006 | Joo | H04L 51/38 455/466 |
| 2007/0116229 | A1* | 5/2007 | Lederer | H04M 1/274516 379/211.02 |
| 2008/0091550 | A1* | 4/2008 | Zacarias | G06Q 30/08 705/26.3 |
| 2009/0054090 | A1* | 2/2009 | Deng | H04M 1/57 455/466 |
| 2009/0304169 | A1* | 12/2009 | Chow | H04M 3/4878 379/201.01 |
| 2011/0228763 | A1* | 9/2011 | Magnus | H04M 1/72561 370/352 |
| 2011/0295749 | A1* | 12/2011 | Scalisi | G06Q 20/10 705/44 |
| 2012/0066096 | A1* | 3/2012 | Penide | G06Q 20/12 705/27.1 |
| 2012/0095856 | A1* | 4/2012 | Sanjeev | G06Q 20/204 705/17 |
| 2014/0156407 | A1* | 6/2014 | Dinardo | H04W 12/08 705/14.56 |
| 2015/0181025 | A1* | 6/2015 | McBride | H04M 3/42008 455/413 |
| 2015/0332370 | A1 | 11/2015 | Kumar et al. | |

OTHER PUBLICATIONS

Anonymous Payment in a Client Centric Model for Digital Ecosystems—2007 Inaugural IEEE International Conference on Digital Ecosystems and Technologies, Jesu's Tellez Isaac and Jose Sierra Caimara (Year: 2007).*

Advisory Action received for U.S. Appl. No. 14/280,515, dated Jul. 11, 2017, 9 pages.

Advisory Action received for U.S. Appl. No. 14/280,515, dated Sep. 27, 2018, 6 pages.

Applicant Initiated Interview Summary received for U.S. Appl. No. 14/280,515, dated Jul. 7, 2017, 1 page.

Decision on Pre-Appeal Brief received for U.S. Appl. No. 14/280,515, dated Dec. 14, 2018, 2 pages.

Final Office Action received for U.S. Appl. No.14/280,515, dated Dec. 13, 2016, 24 pages.

Final Office Action received for U.S. Appl. No. 14/280,515, dated Jun. 15, 2018, 20 pages.

Non-Final Office Action received for U.S. Appl. No. 14/280,515, dated Dec. 28, 2018, 18 pages.

Non-Final Office Action received for U.S. Appl. No. 14/280,515, dated Jan. 3, 2018, 14 pages.

Non-Final Office Action received for U.S. Appl. No. 14/280,515, dated Mar. 10, 2015, 24 pages.

Non-Final Office Action received for U.S. Appl. No. 14/280,515, dated May 26, 2016, 28 pages.

Non-Final Office Action received for U.S. Appl. No. 14/280,515, dated Sep. 23, 2015, 21 pages.

Notice of Allowance received for U.S. Appl. No. 14/280,515, dated May 31, 2019, 19 pages.

Pre Appeal Brief filed on Oct. 26, 2018, for U.S. Appl. No. 14/280,515, 8 pages.

Response to Advisory Action and Final Office Action filed on Aug. 31, 2017, for U.S. Appl. No. 14/280,515, dated Jul. 11, 2017, 11 pages.

Response to Final Office Action filed on May 10, 2017, for U.S. Appl. No. 14/280,515, dated Dec. 13, 2016, 16 pages.

Response to Final Office Action filed on Aug. 14, 2018, for U.S. Appl. No. 14/280,515, dated Jun. 15, 2018, 19 pages.

Response to Non-Final Office Action filed on Dec. 28, 2015, for U.S. Appl. No. 14/280,515, dated Sep. 23, 2015, 20 pages.

Response to Non-Final Office Action filed on Feb. 8, 2018 for U.S. Appl. No. 14/280,515, dated Jan. 3, 2018, 11 pages.

Response to Non-Final Office Action filed on Jan. 29, 2019, for U.S. Appl. No. 14/280,515, dated Dec. 28, 2018, 19 pages.

Response to Non-Final Office Action filed on Jun. 10, 2015, for U.S. Appl. No. 14/280,515, dated Mar. 10, 2015, 29 pages.

Response to Non-Final Office Action filed on Oct. 26, 2016, for U.S. Appl. No. 14/280,515, dated May 26, 2016, 20 pages.

* cited by examiner

METHOD AND SYSTEM FOR SMS INTERMEDIATION

CLAIM OF PRIORITY

This application is a continuation of and claims priority to U.S. patent application Ser. No. 14/280,515, filed May 16, 2014, entitled "Method and System for SMS Intermediation", which claims priority under 35 USC 119 or 365 to Indian Application No. 1087/CHE/2014, filed Mar. 3, 2014, the disclosures of which are incorporated in their entirety.

TECHNICAL FIELD

The present application relates to networked commerce systems generally and specifically to enabling user communication in the networked commerce systems.

BACKGROUND

The rise of the computer age has resulted in increased commercial opportunities for people all over the world. One such improvement is the development of commerce systems and platforms designed to allow users to buy and sell products and services over the Internet. In this way, much of the cost associated with selling goods and services is removed and more people are able to participate meaningfully in the marketplace as both buyers and sellers.

In order to facilitate a well-functioning marketplace, online commerce systems often allow users to send messages and communicate back and forth. This allows buyers and sellers to ask questions and iron out details prior to the conclusion of a commercial interaction. However, many communication methods currently implemented in online commerce systems, such as e-mails or messages internal to the commerce system, are either not very convenient for users who do not want to spend all day monitoring messages at a computer or provide insufficient privacy protections for both buyers and sellers.

BRIEF DESCRIPTION OF THE DRAWINGS

Some embodiments are illustrated by way of example and not limitation in the figures of the accompanying drawings in which.

Like reference numerals refer to corresponding parts throughout the drawings.

DETAILED DESCRIPTION

Figure 1:
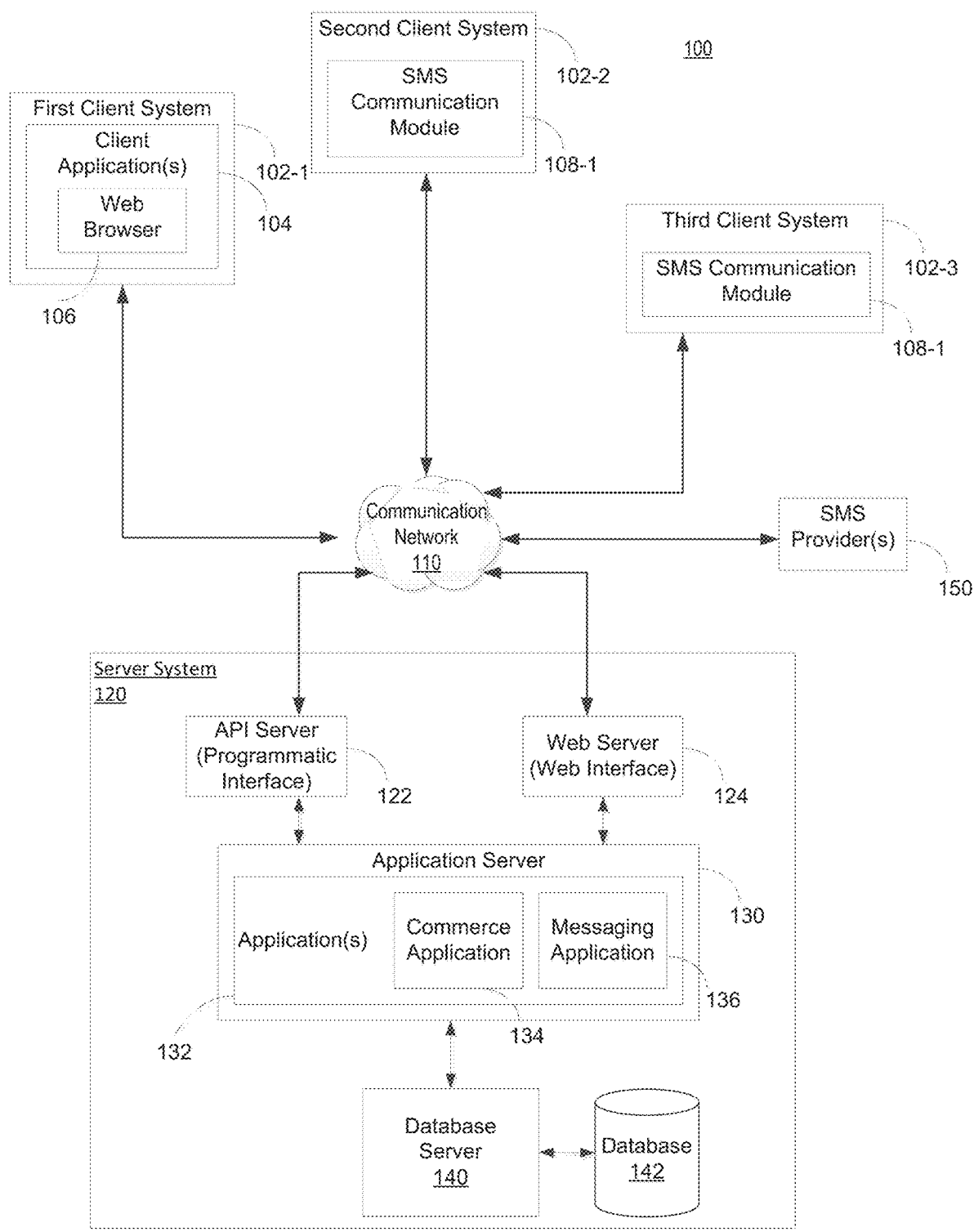
FIG. 1 is a network diagram depicting a client-server system, in accordance with some implementations.

Example methods and systems for transmitting user messages through a short message service (SMS) protocol are described. In the following description, for purposes of explanation, numerous specific details are set forth in order to provide a thorough understanding of example implementations. It will be evident, however, to one skilled in the art that the various implementations may be practiced without these specific details.

Online commerce systems rely on providing the best, most flexible, and convenient user experience. One way to increase flexibility and convenience while still maintaining privacy is to allow users to send SMS messages to each other. Allowing SMS messages between users enables users to follow and control their selling and buying opportunities even when they don't have access to a web browser or email client. This is especially important in developing markets where SMS messaging is a dominant form of communication.

Furthermore, online commerce systems derive revenue when commercial interactions are conducted through their systems (e.g., a commerce system charges a fee or a percentage of a sale as payment for use of the system). By acting as an intermediary, the commerce system ensures that users do not directly contact each other to avoid paying the system fee. Thus, it is important to avoid grey-market activity, wherein users employ the commerce system to arrange a transaction (using resources of the system) and then actually perform the transaction outside of the system. The commerce system then pays the cost to arrange the transaction but does not receive any benefit when the transaction actually occurs.

In some implementations a user (e.g., prospective buyer) requests a web page related for a product (e.g., product page) on a networked commerce system. The networked commerce system then responds by sending the requested product page to the requesting user. The networked commerce system has a pool of available SMS numbers to use for SMS intermediation. However, because each number can only be assigned to one transaction at a time, the networked commerce system first determines whether there are currently any SMS numbers available in the pool. If at least one SMS number is available, the networked commerce system then includes an SMS message link in the product page and sends it to the requesting user for display. If no SMS numbers are available, no SMS message link will be included in the product page.

The networked commerce system sends the product page to the buyer's system for display. If the buyer has questions for the seller, the buyer can elect to send a question to the seller. The buyer can select the "send SMS message" link to send an SMS message to the networked commerce system. The SMS message will contain the text of the message as well as the intended recipient. The networked commerce system then receives the SMS message (a first SMS message in this transaction). In response, the networked commerce system creates a transaction record. A transaction record stores the Buyer ID, the Seller ID, and a transaction ID. The networked commerce system will then assign an available SMS number to the transaction record.

In some implementations, the networked commerce system transmits the first SMS message to the seller (e.g., a second client system). The SMS message will list the allocated SMS number as the source of the SMS message. In this way, the actual SMS number of the buyer is concealed from the seller. The buyer will likely appreciate this additional privacy. The commerce system also benefits by avoiding grey market activity (users that avoid fees through direct communication and transactions). The buyer also submits his or her own SMS number to the networked commerce system so that any responses can be sent as an SMS message. In some implementations the SMS message can also be simultaneously sent to the seller as an email or other message type.

In some implementations the seller responds to the SMS message with a follow up SMS message of his or her own. The SMS message is sent to the SMS number allocated by the networked commerce system and thus is received at the networked commerce system. The networked commerce system users the SMS number to identify the associated transaction record and forwards the response SMS message to the user, either as an SMS message, an email, or any other communication method. In this way a buyer and seller can use SMS messages to communicate back and forth without exposing their personal contact information to each other.

FIG. 1 is a block diagram illustrating a client-server system 100 that includes one or more client systems (e.g., 102-1, 102-2, and 102-3), a server system 120, and one or more SMS providers 150. One or more communications networks 110 interconnect these components. The communications network 110 may be any of a variety of networks, including local area networks (LAN), wide area networks (WAN), wireless networks, wired networks, the Internet, personal area networks (PAN) or a combination of such networks.

In some implementations, a first client system 102-1 includes one or more client applications 104, which are executed by the client system 102-1. The client application(s) 104 includes one or more applications from the set consisting of search applications, communication applications, productivity applications, game applications, word processing applications, or any other useful applications. The client application(s) 104 includes a web browser 106. The first client system 102-1 uses the web browser 106 to communicate with the server system 120 and display information received from the server system 120.

The first client system 102-1 sends a request to the server system 120 for a particular product page (e.g., a web page that lists the details of a product for sale through the server system 120). For example, a user of the first client system 102-1 is interested in purchasing a television. After searching for appropriate television product pages, the user selects a particular product and the first client system 102-1 sends a request for the selected product page. The first client system 102-1 then receives the requested product page from the server system 120. The requested product page includes details related to the product for sale, including, but not limited to, a picture of the product, the product specifications, the current price, a buy-it-now price, the seller ID, the seller reputation score, and a message link that allows the buyer to send the seller a question. The message link allows the sender to choose one or more server communication methods, including but not limited to an e-mail, an internal message through the server system 120, an SMS message, or a combination of these messaging methods (e.g., both an email and an SMS message).

In accordance with some implementations, once the requested product page has been displayed, the user associated with the first client system 102-1 selects the option to send a message to the seller. The product page may also include a text entry area that allows the user of the first client system 102-1 to enter a message (e.g., question for the seller) without having to load a separate web page. Thus, the user enters the message text and then selects a send message button and the message is automatically sent without having to use another web page to prompt the user for message text. In some implementations, the user also selects the message delivery method and enters the message simultaneously.

In some implementations, the second client system 102-2 is an electronic device such as a cell phone, a smartphone, a tablet computer, a laptop, a personal computer, or other electronic device. In some implementations, the second client system 102-2 includes a SMS communication module 108-1 for receiving and sending short messaging service (SMS) messages over a communication network 110. The SMS communication module 108-1 receives an SMS message over a communication network 110 from the server system 120. The SMS message includes at least the product ID number, the buyer ID, the text of the message, the sender SMS number (e.g., a number associated with the sender), and the recipient SMS number (e.g., the number assigned to the second client system).

In some implementations, a user associated with the second client system 102-2 (e.g., the seller) chooses to respond to the received SMS message. The second client system 102-2 uses the SMS communication module 108-1 to transmit the response message to the server system 120. The response is then delivered to the original sender (e.g., in this case the prospective buyer) as an email, an SMS message, an internal message through the server system 120, or any other communication method.

The server system 120 includes an API server (Programmatic Interface) 122, a web server (Web Interface) 124, an application server 130, a database server 140, and a database 142. The application server 130 includes one or more application(s) 132, a commerce application 134, and a messaging application 136.

The Application Program Interface (API) 122 and the web server 124 are coupled to, and provide programmatic and web interfaces respectively to, one or more application servers 130. For example, the application servers 130 host one or more applications 132. The application servers 130 are, in turn, shown to be coupled to one or more databases servers 140 that facilitate access to one or more databases 142. In some implementations, the application server 130 hosts one or more applications 132. The one or more applications 132 include at least a commerce application 134 and a messaging application 136.

In some implementations, the commerce application 134 allows a plurality of users (e.g., buyers and sellers) to conduct commercial transactions with each other and the server system 120 via the communication network 110. In some implementations, the commerce application 134 is an online auction application. In some implementations, the messaging application 136 allows users of the server system 120 to communicate with each other, either directly through the server system's 120 internal messaging system (e.g., messages from one user account to another user account), through e-mails to e-mail addresses associated with the users, or through an SMS messaging protocol.

In some implementations, the database server 140 facilitates communication between the application server 130 and the database 142. The database 142 stores information needed by the applications 132 stored on the application server 130. For example, the database 142 stores product information, user IDs, user contact information, and user ratings.

While FIG. 1 shows a client-server architecture, other architectures could implement the herein disclosed implementations such as a distributed, or peer-to-peer, architecture system, for example. The various applications 132 could also be implemented as standalone software programs, which do not necessarily have networking capabilities.

The web browser 106 accesses the various applications 132 via the web interface supported by the web server 124. In some implementations, one or more SMS provider(s) 150 are connected to the communication network 110. The one or more SMS providers 150 allocate SMS numbers, as needed, to the server system 120, the second client system 102-2 and third client system 102-3. The SMS providers 150 receive SMS messages and transfer them to their intended recipients, based on data stored at the SMS providers 150.

Figure 2:
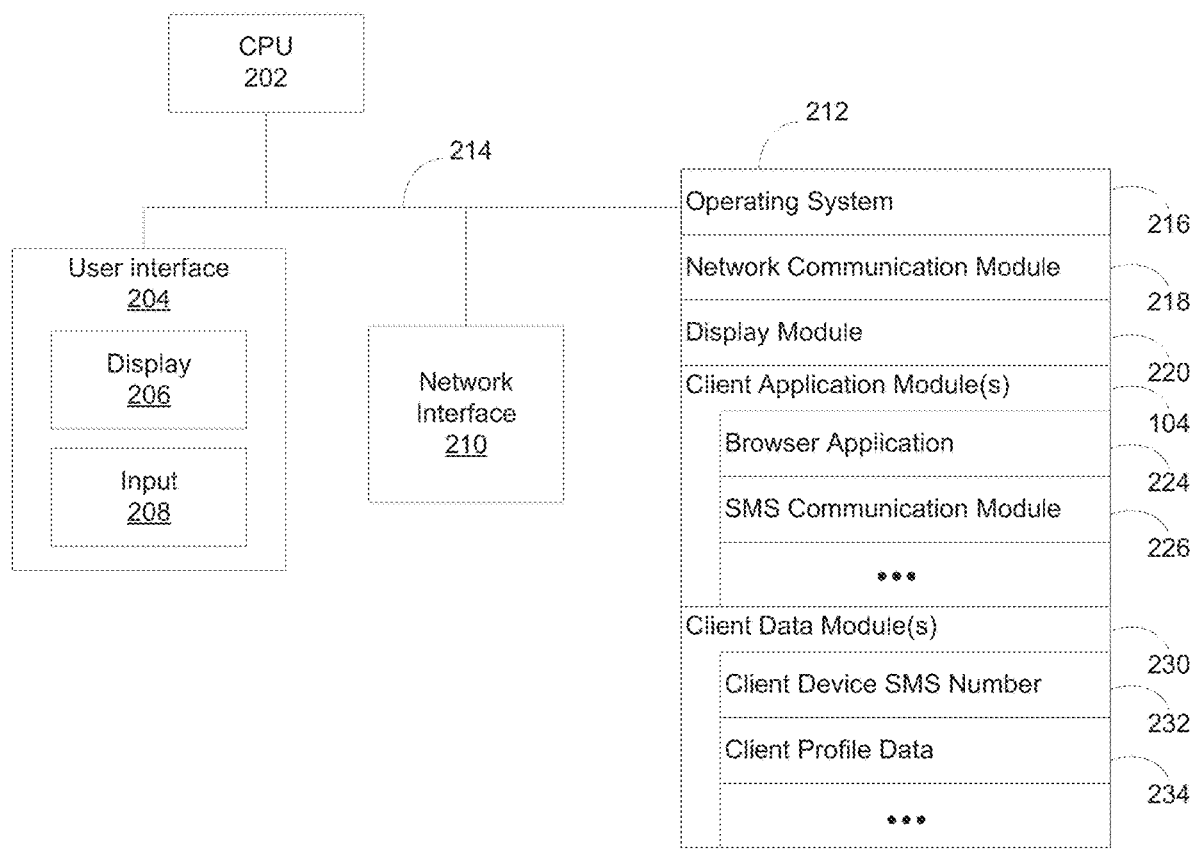
FIG. 2 is a block diagram illustrating a client system in accordance with some implementations.

FIG. 2 is a block diagram illustrating a client system 102 in accordance with some implementations. The client system 102 typically includes one or more processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a non-transitory computer readable storage medium.

In some implementations, memory 212 or the computer readable storage medium of memory 212 stores the following programs, modules and data structures, or a subset thereof:
- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks (e.g., communication network 110 of FIG. 1), such as the Internet, other wide area networks, local area networks, metropolitan area networks, etc.;
- a display module 220 for enabling the information generated by the operating system 216 and client applications 104 to be presented visually on the display device 206;
- one or more client applications 104 for handling various aspects of interacting with the server system 120, including but not limited to:
  - a browser application 224 for requesting information from the server system 120 of FIG. 1 (e.g., product pages and user information) and receiving the response from the server system 120; and
  - an SMS communication module 226 for sending and receiving SMS messages from the server system (FIG. 1, 120) via the one or more SMS service providers (FIG. 1, 150); and
- a client data module 230 for storing data relevant to the clients, including but not limited to:
  - a client device SMS number 232 (e.g., the SMS number associated with the client device); and
  - client profile data 234 that includes data about the client.

Figure 3:
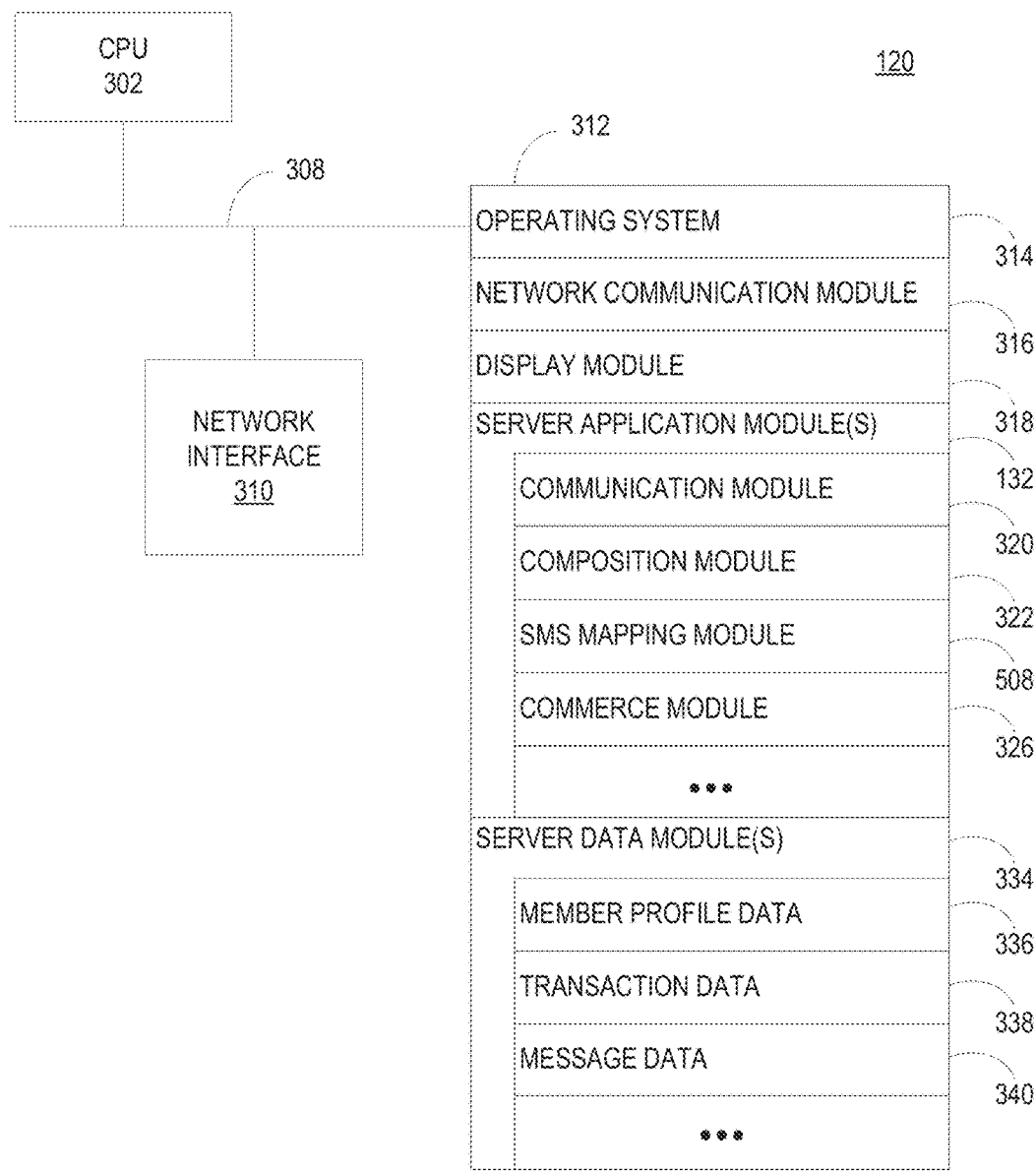
FIG. 3 is a block diagram illustrating a server system in accordance with some implementations.

FIG. 3 is a block diagram illustrating a server system (FIG. 1, 120). The server system (FIG. 1, 120) typically includes one or more processing units (CPUs) 302, one or more network interfaces 310, memory 312, and one or more communication buses 308 for interconnecting these components. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302.

Memory 312, or alternately the non-volatile memory device(s) within memory 312, comprises a non-transitory computer readable storage medium. In some implementations, memory 312 or the computer readable storage medium of memory 312 stores the following programs, modules and data structures, or a subset thereof:
- an operating system 314 that includes procedures for handling various basic system services and for performing hardware dependent tasks;
- a network communication module 316 that is used for connecting the server system 120 to other computers via the one or more communication network interfaces 310 (wired or wireless) and one or more communication networks, such as the Internet, other wide area networks, local area networks, metropolitan area networks, and so on;
- one or more server application modules 132 for performing the services offered by server system 120, including but not limited to:
  - a communication module 320 for relaying messages between users of the server system 120;
  - a composition module 322 for creating web pages to be sent to a client system based on user requests;
  - an SMS mapping module 508 for retrieving an SMS number based on a transaction record ID and retrieving a transaction record based on an SMS number; and
  - a commerce module 326 for processing commercial transactions;
- server data modules 334, holding data related to the server system 120, including but not limited to:
  - member profile data 336 including data concerning user demographic information, user interests, products for sale, previous purchases, user location data (e.g., based on GPS data), and any other relevant user data;
  - transaction data 338 including a plurality of transaction records; and
  - message data 340 including the text of messages sent between current users of the server system 120.

Figure 4:
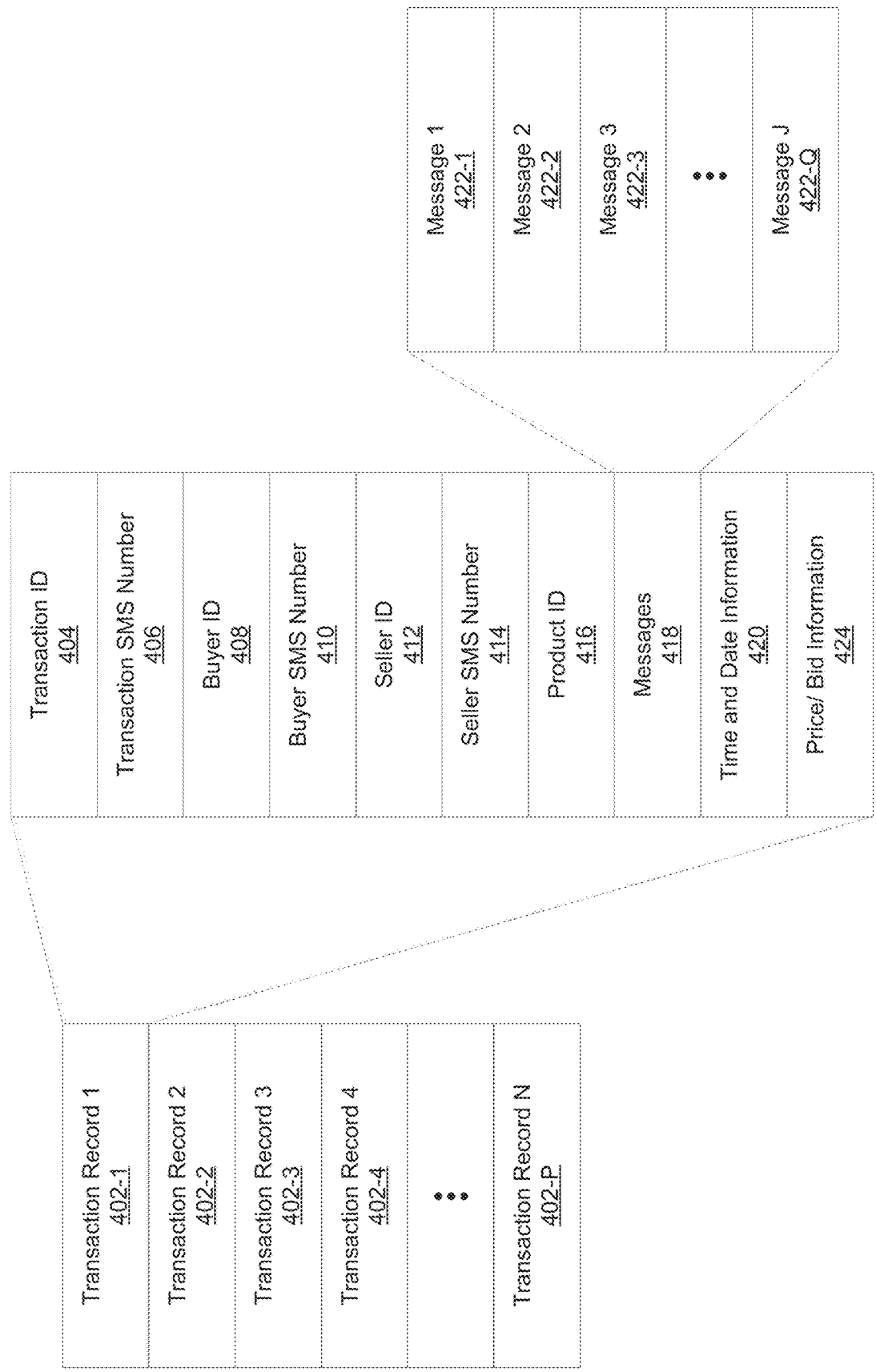
FIG. 4 depicts a block diagram of an exemplary data structure for a transaction database for storing transaction records in accordance with some implementations.

FIG. 4 depicts a block diagram of an exemplary data structure for a transaction database for storing transaction records in accordance with some implementations. In accordance with some implementations, the transaction database data structure includes a plurality of transaction records 402-1 to 402-P, each of which corresponds to a commercial transaction occurring (or potentially occurring) on the server system (FIG. 1, 120). For example, when a user (e.g., potential buyer) takes a specific action with regards to a particular product (e.g., submitting a bid, submitting a question for the seller of the particular product, choosing to buy-it-now, submitting a user rating, etc.), the result is the creation of a transaction record 402. Each transaction record 402-1 to 402-P stores the relevant information for each transaction.

In some implementations, a respective transaction record 402 stores a unique transaction ID 404 for the transaction, a transaction SMS number 406 (e.g., a number specifically allocated to the respective transaction record), a buyer ID 408, a buyer SMS number 410, a seller ID 412, a seller SMS number 414, a product ID 416, a list of one or more messages 418, time and date information 420, and price/bid information 424.

In some implementations, the transaction SMS number 406 is an SMS number specifically allocated for the transaction associated with the transaction record 402. The buyer ID 408 is a unique value associated with the buyer consistently throughout the entire server system 120. The buyer SMS number 410 is an SMS number associated with an electronic device (e.g., a mobile phone, a smartphone, a tablet computer, etc.) owned or used by the buyer.

In some implementations, the seller ID 412 is a unique value associated with the seller consistently throughout the entire server system 120 to identify that particular user. The seller SMS number 414 is an SMS number associated with an electronic device (e.g., a mobile phone, a smartphone, a tablet computer, etc.) owned or used by the seller. In some implementations, the product ID 416 is a unique value assigned by the server system 120 to a unique product.

In some implementations, a transaction record 402 includes a list of messages 418 associated with the transaction. In some implementations, there are no messages 418 in the list of messages 418. In other implementations, the list of messages 418 has one or more messages 418. Each message record (422-1-422-Q) includes, but is not limited to, a listing of the sender, the recipient, the text of the message 418, and the time the message 418 was sent.

In some implementations, a transaction record 402 includes the time and date information 420 associated with the transaction, including, but not limited to, the time when the transaction record 402 was created, the times associated with any bids submitted by the user, and an ending time at which point the product associated with the product ID 416 will no longer be available. In some implementations, a transaction record 402 includes price and bid information 424. The price and bid information 424 includes, but is not limited to, the current price of the product associated with the product ID 416, a list of bids previously submitted for the product associated with the product ID 416, and a buy-it-now price.

Figure 5:
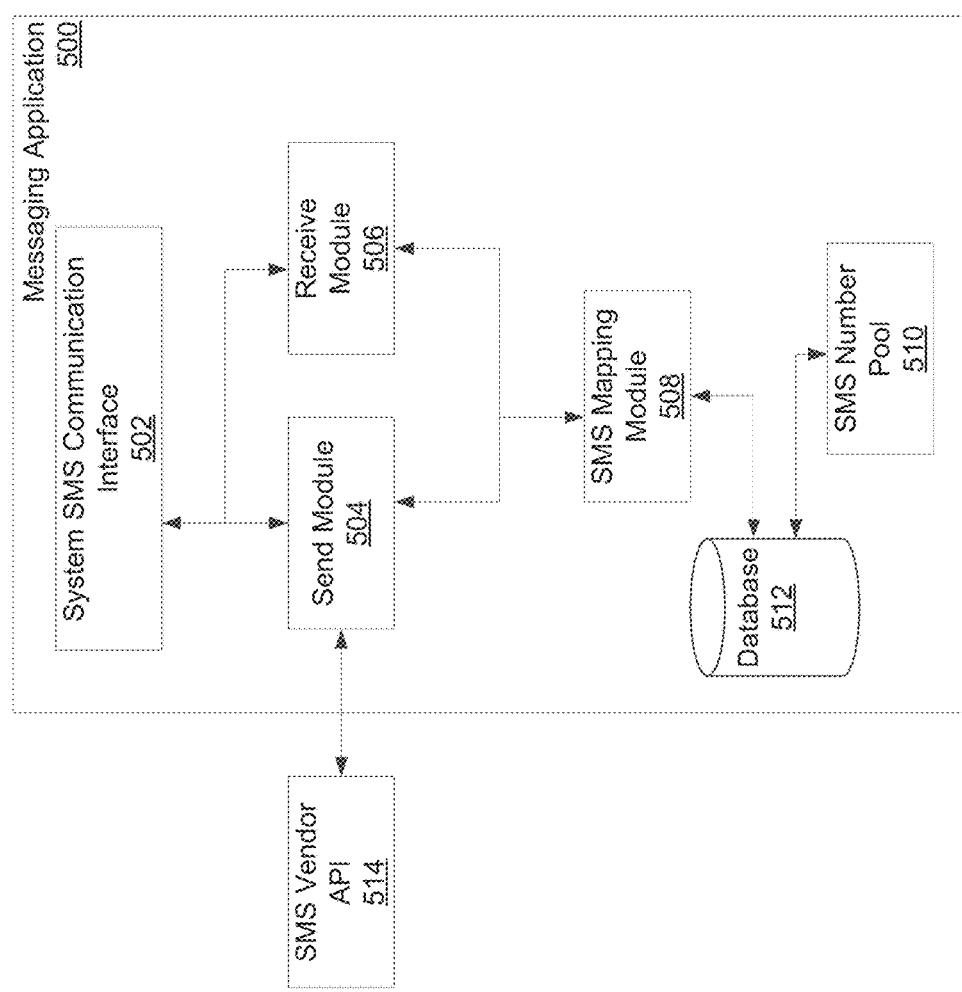
FIG. 5 is a block diagram illustrating an SMS mediation system in accordance with some implementations.

FIG. 5 is a block diagram illustrating a server system (FIG. 1, 120) in accordance with some implementations. In some implementations, the server system 120 includes a system SMS communication interface 502, a send module 504, a receive module 506, an SMS mapping module 508, a transaction record database 512, an SMS number pool 510, and an SMS vendor API 514.

In some implementations, the system SMS communication interface 502 connects the server system 120 to the communication network (FIG. 1, 110) through which SMS messages are received and sent. In other implementations, the system SMS communication interface 502 also communicates with the messaging application (FIG. 1, 136) of the server system (FIG. 1, 120) to receive outgoing messages from users of the server system 120. In some implementations, the system SMS communication interface 502 determines whether a received message is an incoming SMS message from the communication network (FIG. 1, 110) or an outgoing message from the messaging application 136 of the server system 120. In some implementations, the system SMS communication interface 502 determines that the received message is an incoming SMS message (e.g., text message) from the communication network 110, and in response, passes the received message to the receive module 506. For example, the system SMS communication interface 502 receives a message from the communication network (FIG. 1, 110), determines that it is an incoming text message, and then immediately transfers the message to the receive module 506. In some implementations, the system SMS communication interface 502 determines that a message is an incoming SMS message based on the metadata associated with the message.

In some implementations, the system SMS communication interface 502 determines that the received message is an outgoing message from the messaging application 136 of the server system 120. In response to determining that the received message is an outgoing SMS message received from the messaging application 136 of the server system 120, the system SMS communication interface 502 passes the message to the send module 504. For example, if a user of the server system 120 selects the option to send an SMS message to a second user, the messaging application 136 sends the message and the second user's SMS number to the system SMS communication interface 502. The system SMS communication interface 502 then passes the received message to the send module 504.

In some implementations, the receive module 506 receives an incoming SMS message from the system SMS communication interface 502. The receive module 506 analyses the incoming SMS message to extract the source SMS number (e.g., the SMS number associated with the sender of the SMS message), the target SMS number (e.g., the SMS number to which the message was sent), and the text of the message. For example, the receive module 506 determines that the SMS message has a source SMS number of 408-555-5501, a target SMS number of 408-555-5502, and that the text of the message is "The device is slightly larger than a breadbox."

In some implementations, the receive module 506 determines the user ID of the intended recipient of the SMS message by transmitting the extracted target SMS number to the SMS mapping module 508.

In some implementations, the SMS mapping module 508 receives a target SMS number from the receive module 506. The SMS mapping module 508 uses the transaction record database 512 to identify a transaction record ID associated with the target SMS number. The SMS mapping module 508 uses the received SMS number to look up the associated transaction record (e.g., transaction record 402 of FIG. 4) in the database 512. For example, if the received SMS number is "408-555-5503," the SMS mapping module 508 uses that number to retrieve the associated transaction record from the database 512. The retrieved transaction record is then returned to the receive module 506.

In some implementations, the receive module 506 receives a transaction record from SMS mapping module 508 that matches the received SMS number. The receive module 506 then identifies the user ID of the intended message recipient. In some implementations, the receive module 506 identifies the intended message recipient by comparing the source SMS number of the received message to both the buyer SMS number and the seller SMS number. If the source SMS number matches the buyer SMS number, the receive module 506 determines that the seller is the intended target and vice versa. For example, because SMS messages within a transaction are typically between a specific buyer and a specific seller, if the source is the seller, the receive module 506 can determine that the intended message recipient is the buyer. Analogously, if the source is the buyer, the receive module 506 determines that the intended message recipient is the seller.

In some implementations, once the receive module 506 has determined the intended recipient, the receive module 506 transmits the received message text and the user ID of the intended recipient to the system SMS communication interface 502. The system SMS communication interface 502 then transmits the message to the user associated with the user ID of the intended recipient. In some implementations, the message is transmitted as an SMS message. In other implementations, the message is transmitted as an email or an internal message on the server system 120. In yet other implementations, the message is transmitted through more than one message medium (e.g., both as an SMS message and an e-mail message). In some implementations, the SMS message is sent via the SMS vendor API 514.

In some implementations, the send module 504 receives an outgoing message from the system SMS communication interface 502. The send module 504 then determines the whether the outgoing message has an associated transaction record. If the outgoing message does not have an associated transaction record, the server system 120 creates a transaction record. The transaction record number is sent to the SMS mapping module 508 to determine an SMS number to use as a source number for the outgoing text message.

The SMS mapping module 508 receives a transaction ID (e.g., transaction ID 404 of FIG. 4) from the send module 504. The SMS mapping module 508 uses the received transaction ID to retrieve a transaction record from the database 512. The SMS mapping module 508 determines whether the retrieved transaction record has an associated transaction SMS number (e.g., transaction SMS number 406 of FIG. 4). In accordance with a determination that the retrieved transaction record has an associated transaction SMS number, the SMS mapping module 508 returns the associated transaction SMS number to the send module 504. In accordance with a determination that the retrieved transaction record does not have an associated transaction SMS number, the SMS mapping module 508 requests an available SMS number from the SMS number pool 510. Once an available number has been allocated to the retrieved transaction record, the allocated number is returned to the send module 504.

The send module 504 uses the allocated SMS number to send the outgoing message as an SMS text message. In some implementations, the send module 504 transmits the outgoing message text to the SMS vendor API 514 along with the allocated SMS number and the SMS number of the intended recipient. The allocated SMS number is used as the source number for the transmitted SMS message (e.g., the message lists the allocated SMS number as the source of the SMS message and any replies will be sent to the allocated SMS number). In this way the server system 120 is able to act as an intermediary between a buyer and seller, allowing both to communicate while keeping their actual SMS numbers hidden from each other. For example, buyer A and seller B are involved in transaction C for product D. Buyer A wants to send an SMS message to seller B, but without revealing his/her actual SMS number. Buyer A selects the "Send an SMS message" button on a product page. The server system 120 creates a transaction record 402 and allocates a transaction SMS number 406 to the transaction record 402. The server system 120 then transmits the message from Buyer A to Seller B with the allocated transaction SMS number 406 as the source. When Seller B replies, the message is sent to the allocated transaction SMS number 406, not directly to Buyer A. The server system 120 uses the allocated transaction SMS number 406 to identify the appropriate transaction record 402. The server system 120 (e.g., receive module 506) uses the identified transaction record 402 to determine the SMS number of Buyer A and then transmits the reply to Buyer A, still using the allocated transaction SMS number 406 as the source. Thus both Buyer A and Seller B only see the allocated transaction SMS number 406 as the source of the messages; their true SMS numbers are hidden. This allows a degree of anonymity to the users of a web commerce site, while still allowing the speed and convenience of SMS messages.

Figure 6:
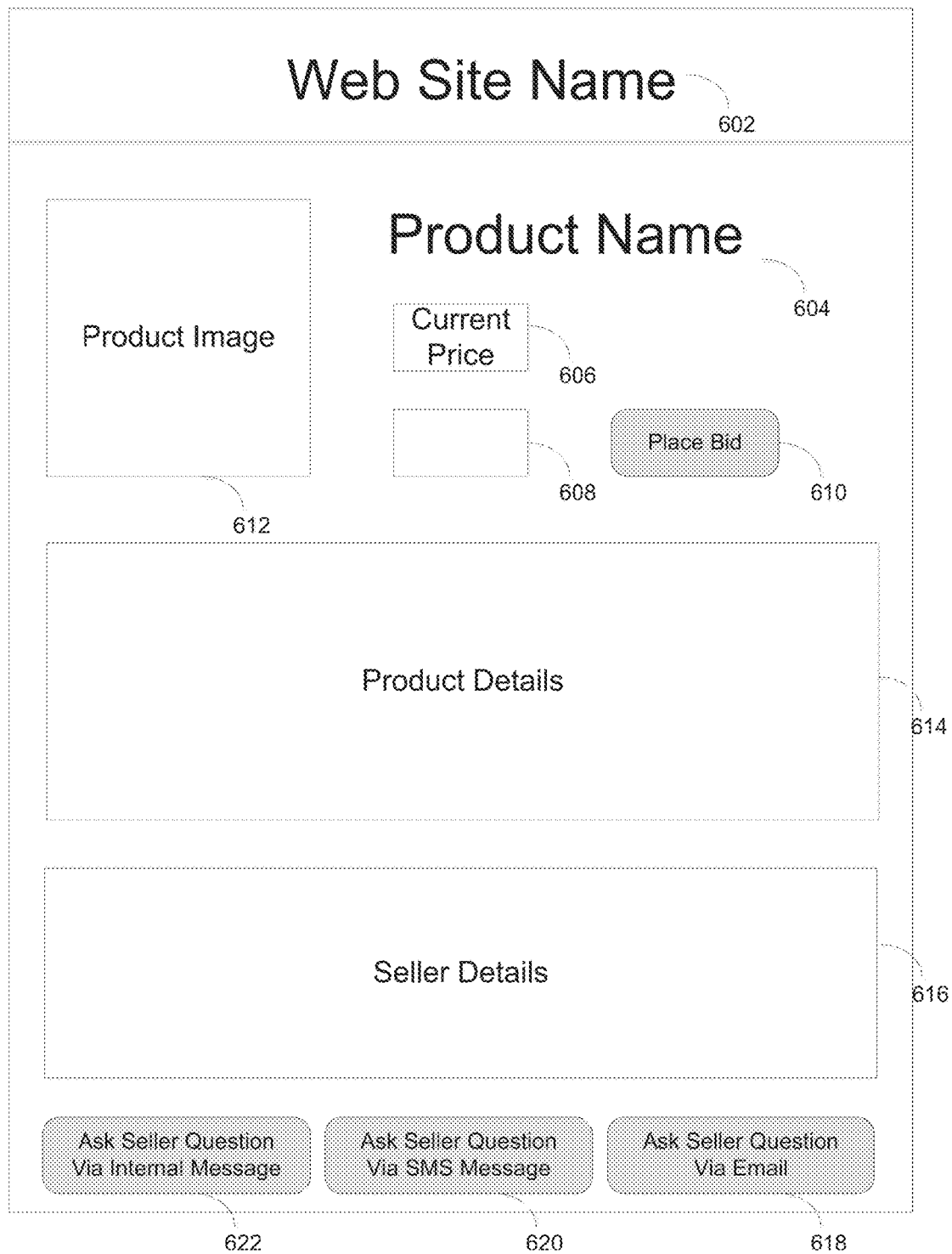
FIG. 6 illustrates an exemplary user interface for a product page of a networked commerce web site.

FIG. 6 illustrates an exemplary user interface 600 for a product page of a networked commerce web site. In this example the user interface 600 includes a title bar 602 that displays the name of the website. Below the website title bar 602 is the product name 604 and one or more product images 612. Both the product name 604 and the product image 612 serve to help identify the product being sold on the product page. The user interface 600 also includes a current price area 606 of the product. During an auction, the current price of the product is updated as the bids increase and displayed in the current price area 606. If the sale is not an auction, the current price area 606 displays the cost of the item (e.g., generally stays constant except in the case of a sale). The product page also includes a bid text entry box 608. A user enters a bid price in the bid text entry box 608 and clicks on the place bid button 610.

The product page user interface 600 includes a product details area 614. The product details area 614 lists one or more details of the product. For example, if the product is a toaster, the product details area 614 of the product page lists the size of the toaster, the number of pieces of toast it can toast at a time, the maximum temperature, and any other information relevant to the toaster. The product page also includes a seller details area 616. The seller details area 616 lists details of the seller including the seller's ID, the seller's reputation score, an associated homepage, and any other information associated with the seller.

At the bottom of the product page are several messaging buttons. A user can click on the email question button 618 to send the seller a question via email. Similarly, the SMS message button 620 allows a user to send a question as an SMS message to the seller. The internal messaging button 622 allows a user to send a question to the seller via an internal message (e.g., a message that is delivered to the seller through the server system 120). In some implementations, clicking on any of the three buttons 618, 620, 622 will result in display of a messaging interface with the messaging method selected.

Figure 7:
FIG. 7 illustrates an exemplary user interface for a messaging user interface screen for a networked commerce website.

FIG. 7 illustrates an exemplary user interface 700 for a messaging user interface screen for a networked commerce website. In this example the user interface 700 includes a title bar 602 that displays the name of the website. Below the website title bar 602 is the product name 604 and one or more product images 612. Both the product name 604 and the product image 612 serve to help identify the product being sold. The user interface 700 further includes a current price area 702 that displays the current price (e.g., current bid) of the product. The user interface 700 also includes a remaining time area 704 that lists the amount of time remaining on the auction for the product.

Furthermore, the user interface 700 includes a seller ID area 706 that lists the user name of the seller. For example, the seller ID is displayed as the salutation in a message (e.g., Dear [seller ID 706]). Below the seller ID area 706 is the message text entry area 708. The buyer can enter the desired text in the message text entry area 708 and then click the send message button 710. The user interface 700 also includes a "send a copy of message by email" check box 712 and a "send a copy of message by SMS" check box 714. When a user has selected one of the boxes 712, 714, the server system (FIG. 1, 120) system will send a copy of the message based on which check box 712, 714 was selected. A user can also select both boxes 712, 714 and send two copies of the message via two different transmission mediums.

Figure 8:
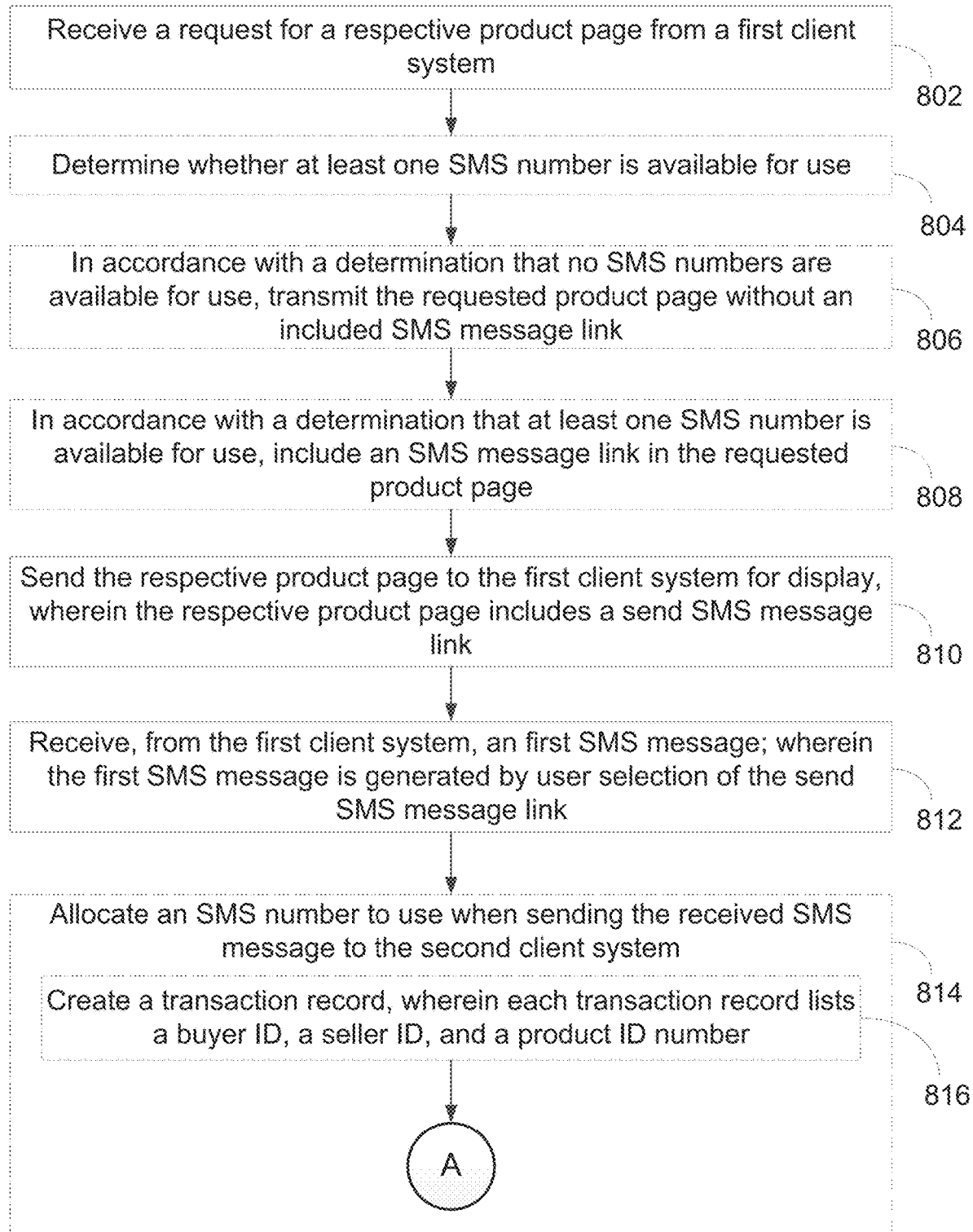
FIG. 8 is a flow diagram illustrating a method for transmitting SMS messages between users of a networked commerce site in accordance with some implementations.

FIG. 8 is a flow diagram illustrating a method for transmitting SMS messages between users of a networked commerce site in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the social network server system 120 illustrated in FIG. 1.

In some implementations the method is performed at a computer system including one or more processors and memory storing one or more programs for execution by the one or more processors, wherein the computer system hosts a networked commerce system. In some implementations the networked commerce system is an online auction system. For example, the networked commerce system is a commercial online auction system such as EBay.

In some implementations the server system (e.g., server system 120) receives (802), a request for a respective product page from a first client system. Each product page in the networked commerce system has an associated seller. The seller can be an individual user of the server system, a small business, a corporation, or other entity.

In some implementations the server system (FIG. 1, 120) determines (804) whether at least one SMS number is available for use. The server system includes a pool of one or more available SMS numbers. However, this pool is limited to SMS numbers allocated from an SMS provider to the server system (FIG. 1, 120). Once all the SMS numbers have been allocated at any given time, no more SMS numbers can be allocated until one of the allocated SMS numbers has been checked back into the pool of available SMS numbers.

In accordance with a determination that no SMS numbers are currently available for use, the server system (FIG. 1, 120) transmits (806) the requested product page without an included SMS message link. Thus, when the web page is displayed to the buyer, there is no displayed option to send an SMS message. In accordance with a determination that at least one SMS number is available for use, the server system (FIG. 1, 120) includes (808) an SMS message link in the requested product page.

The server system (FIG. 1, 120) sends (810) the respective product page to the first client system for display, wherein the respective product page includes a send SMS message link. Selection of a send SMS message link enables the buyer to send an SMS message to the seller of the respective product.

In some implementations the server system (FIG. 1, 120) receives (812) a first SMS message from the first client system. The first SMS message is generated by user selection of the send SMS message link. For example, when a user clicks on the send SMS message link, a messaging user interface is displayed and a user can enter an SMS message for the seller. The server system (FIG. 1, 120) then receives the SMS message.

In some implementations the server system (FIG. 1, 120) allocates (814) an SMS number to use when sending the received SMS message to the second client system. For example, the server system selects one SMS number from the pool of available SMS numbers. In some implementations, allocating an SMS number includes the server system (FIG. 1, 120) creating (816) a transaction record, wherein each transaction record lists a buyer ID, a seller ID, and a product ID number. A buyer ID is a unique value that identifies a specific user of the server system. Similarly a seller ID is also a unique value that identifies a specific user of the server system (FIG. 1, 120). A product ID also identifies a specific product for sale on the network commerce system.

Figure 9:
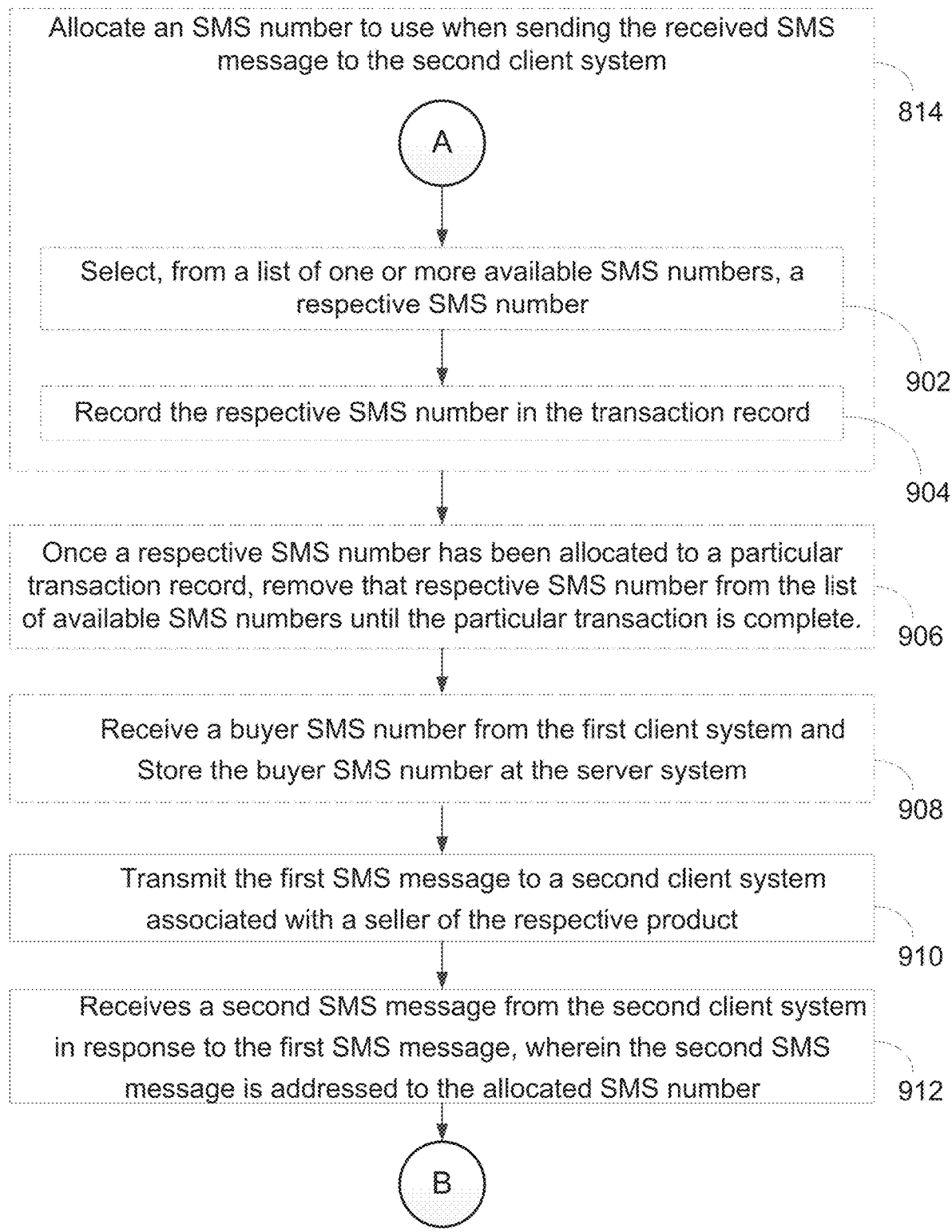
FIG. 9 is a flow diagram illustrating a process for transmitting SMS messages between users of a networked commerce site in accordance with some implementations.

FIG. 9 is a flow diagram illustrating a process for transmitting SMS messages between users of a networked commerce site in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the server system (FIG. 1, 120).

In some implementations the server system (FIG. 1, 120) selects (902), from a list of one or more available SMS numbers, a respective SMS number. The server system can select any SMS number from the pool of available SMS numbers. The server system (FIG. 1, 120) then records (904) the respective SMS number in the transaction record.

In some implementations, once a respective SMS number has been allocated to a particular transaction record, the server system (FIG. 1, 120) removes (906) that respective SMS number from the list of available SMS numbers until the particular transaction is complete. The allocated SMS number is only returned to the available SMS numbers pool when the current transaction is complete (e.g., the auction completes). In some implementations, the allocated SMS can be released back to the available SMS number pool after a predetermined amount of time without a new SMS message (e.g., more than day without a message).

In some implementations, prior to transmitting the received message to the second client system, the server system (FIG. 1, 120) receives (908), from the first client system, a buyer SMS number and stores the buyer SMS number at the server system. Thus, the buyer submits an SMS number to the server system so that the system can transmit SMS messages to the buyer if needed. The server system (FIG. 1, 120) then transmits (910) the first SMS message to a second client system associated with a seller of the respective product. The transmitted SMS message lists the allocated SMS number as the source of the SMS message when it is delivered to the second client system. In this way the SMS number of the buyer is not revealed to the seller. In some implementations the transmitted first SMS message elides the user ID of the user associated with the first client.

In some implementations the server system receives (912) a second SMS message from the second client system in response to the first SMS message, wherein the second SMS message is addressed to the allocated SMS number. In this way, the second user responds to an SMS number associated with the server system (FIG. 1, 120) and the server system (FIG. 1, 120) then forwards the response near instantaneously and automatically to the buyer. This gives both the seller and the user a level of privacy and anonymity.

Figure 10:
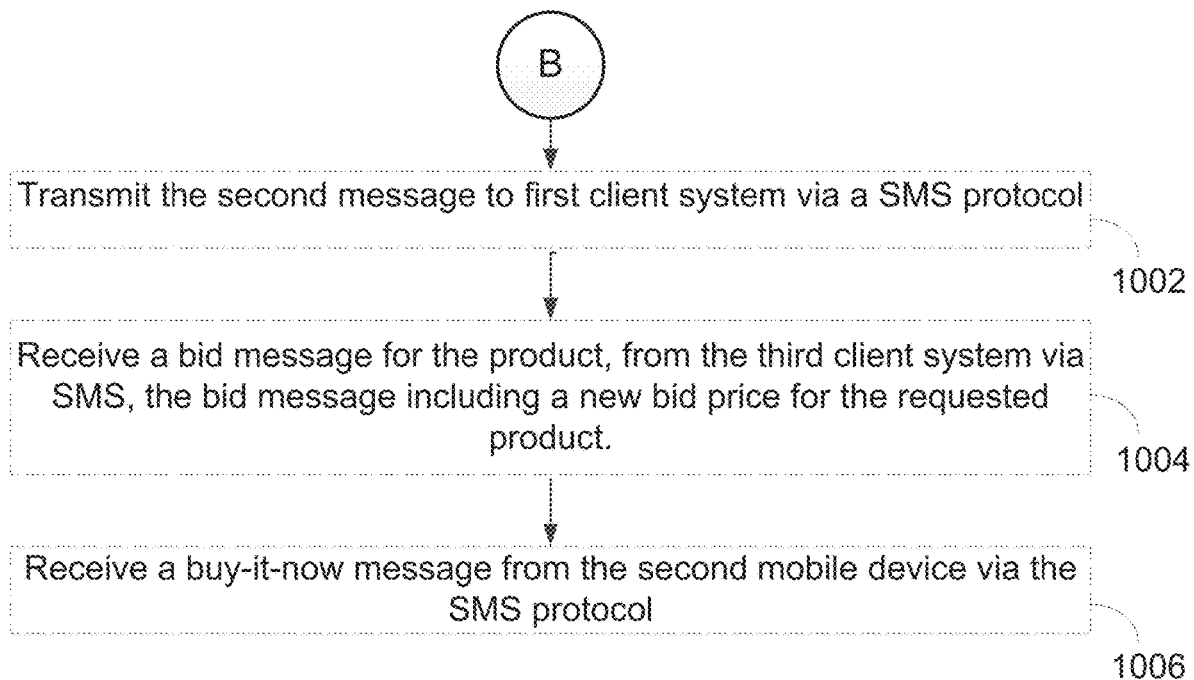
FIG. 10 is a flow diagram illustrating a process for transmitting SMS messages between users of a networked commerce site in accordance with some implementations.

FIG. 10 is a flow diagram illustrating a process for transmitting SMS messages between users of a networked commerce site in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the server system (FIG. 1, 120).

The server system (FIG. 1, 120) transmits (1002) the second message to first client system or third client system (both of which belong to the first user) via a SMS protocol. The second message also lists the allocated SMS number as the source of the text message, thus providing the second user with some privacy.

In some implementations the server system (FIG. 1, 120) receives (1004) a bid message for the product, from the third client system via SMS, the bid message including a new bid price for the requested product. Thus, a bidder can submit a new bid via an SMS message. In some implementations the server system (FIG. 1, 120) receives (1006) a buy-it-now message from the second mobile device via the SMS protocol. A buy-it-now message is a message that agrees to pay a predetermined amount to immediately end the auction and purchase the item. These messages can be sent via SMS messages.

In some implementations, transmitting the first SMS message to the second client system includes simultaneously sending an email containing the received message to a second user associated with the second client system. In some implementations the second client system and/or the third client system are mobile devices.

The foregoing description, for purpose of explanation, has been described with reference to specific implementations. However, the illustrative discussions above are not intended to be exhaustive or to limit the possible implementation so the precise forms disclosed. Many modifications and variations are possible in view of the above teachings. The implementations were chosen and described in order to best explain the principles involved and their practical applications, to thereby enable others skilled in the art to best utilize the various implementations with various modifications as are suited to the particular use contemplated.

It will also be understood that, although the terms "first", "second," etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method of two-way back-and-forth anonymous SMS communication by a first client system for communication with a second client system, the method comprising:
   generating, by the first client system, a first communication;
   transmitting, by the first client system, the first communication to a single SMS number for receipt by the second client system, the single SMS number allocated for two-way back-and-forth anonymous communication using a short message service (SMS) protocol via a network such that the first client system is anonymous to the second client system;
   receiving, by the first client system, a second communication from the single SMS number from the second client system, the second communication transmitted by the second client system to the single SMS number such that the second client system is anonymous to the first client system; and
   displaying, by the first client system, the second communication in a user interface along with an indication of the single SMS number as a source of the second communication.

2. The method as described in claim 1, wherein the single SMS number is indicated as a source of the first communication to the second client system such that the first client system is anonymous to the second client system.

3. The method as described in claim 1, wherein the single SMS number is indicated as a source of the second communication to the first client system such that the second client system is anonymous to the first client system.

4. The method as described in claim 1, wherein the first communication is transmitted to the single SMS number by the first client system from a personal SMS number of the first client system that is not exposed as part of the first communication to the second client system.

5. The method as described in claim 1, wherein the second communication is transmitted to the single SMS number from a personal SMS number of the second client system that is not exposed as part of the second communication to the first client system.

6. The method as described in claim 1, wherein the second communication is generated as a reply to the first communication.

7. The method as described in claim 1, wherein the generating of the first communication is performed in response to receiving a request generated through selection of a link in a user interface to communicate with the second client system of the second party.

8. A method of two-way back-and-forth anonymous SMS communication between a first and second client systems, the method comprising:
   receiving, by the second client system, a first communication communicated via a single SMS number by the first client system, the single SMS number allocated for two-way back-and-forth anonymous communication using a short message service (SMS) protocol via a network such that the first client system is anonymous to the second client system;
   displaying, by the second client system, the first communication in a user interface along with an indication of the single SMS number as a source of the first communication;
   generating, by the second client system, a second communication; and
   transmitting, by the second client system, the second communication to the single SMS number for receipt by the first client system, the second communication transmitted by the second client system to the single SMS number such that the second client system is anonymous to the first client system.

9. The method as described in claim 8, wherein the single SMS number is indicated as a source of the first communication to the second client system such that the first client system is anonymous to the second client system.

10. The method as described in claim 8, wherein the single SMS number is indicated as a source of the second communication to the first client system such that the second client system is anonymous to the first client system.

11. The method as described in claim 8, wherein the second communication is transmitted to the single SMS number from a personal SMS number of the second client system that is not exposed as part of the second communication to the first client system.

12. The method as described in claim 8, wherein the first communication is transmitted to the single SMS number by the first client system from a personal SMS number of the first client system that is not exposed as part of the first communication to the second client system.

13. The method as described in claim 8, wherein the second communication is generated as a reply to the first communication.

14. The method as described in claim 8, wherein the generating of the first communication is performed in response to receiving a request generated through selection of a link in a user interface to communicate with the second client system of the second party.

15. A method of two-way back-and-forth anonymous SMS communication, the method comprising:
   managing, by at least one server system, two-way back-and-forth anonymous communication using a short message service (SMS) protocol via a network such that first and second parties are anonymous to each other, the managing including:
     allocating a single SMS number to use when communicating as part of the back-and-forth communication from:
       a first client system of a first party to a second client system of a second party; and
       the second client system of the second party to the first client system of the first party;
     transmitting a first communication received from the first client system to the second client system using the single SMS number in which the single SMS number is indicated as a source of the first communication to the second client system such that the first party remains anonymous to the second party; and
     transmitting a second communication received from the second client system to the first client system using the single SMS number in which the single SMS number is indicated as a source of the second communication to the first client system such that the second party remains anonymous to the first party.

16. The system as described in claim 15, wherein the first communication is transmitted to the single SMS number by the first client system from a personal SMS of the first client system number that is not exposed as part of the first communication to the second client system.

17. The system as described in claim 15, wherein the second communication is transmitted to the single SMS number from a personal SMS number of the second client system that is not exposed as part of the second communication to the first client system.

18. The system as described in claim 15, wherein the second communication is generated as a reply to the first communication.

19. The system as described in claim 15, wherein:
   the allocating of the single SMS number is performed in response to receiving a request generated through selection of a link in a user interface to communicate with the second client system of the second party; and
   the link is user selectable to automatically display a messaging user interface to receive text for the first communication.

20. The system as described in claim 15, further comprising creating a transaction record including a first ID associated with the first party, a second ID associated with the second party, and a transaction ID and wherein the transaction record is used as part of the managing of the two-way back-and-forth anonymous communication.

* * * * *